Feb. 13, 1951 W. S. MOUL 2,541,477
AUTOMATIC CONTROL CIRCUIT
Filed Oct. 12, 1949

INVENTOR.
WILLIAM S. MOUL,
BY Hall & Houghton
ATTORNEYS

Patented Feb. 13, 1951

2,541,477

UNITED STATES PATENT OFFICE 2,541,477

AUTOMATIC CONTROL CIRCUIT

William S. Moul, York, Pa.

Application October 12, 1949, Serial No. 120,978

12 Claims. (Cl. 171—97)

1

This invention relates to circuit control networks and aims to provide improved control circuits therefor.

The invention resides in the novel arrangements and combinations of controlling elements hereinafter described and claimed.

In the accompanying drawings, illustrative of the invention

Figure 1:
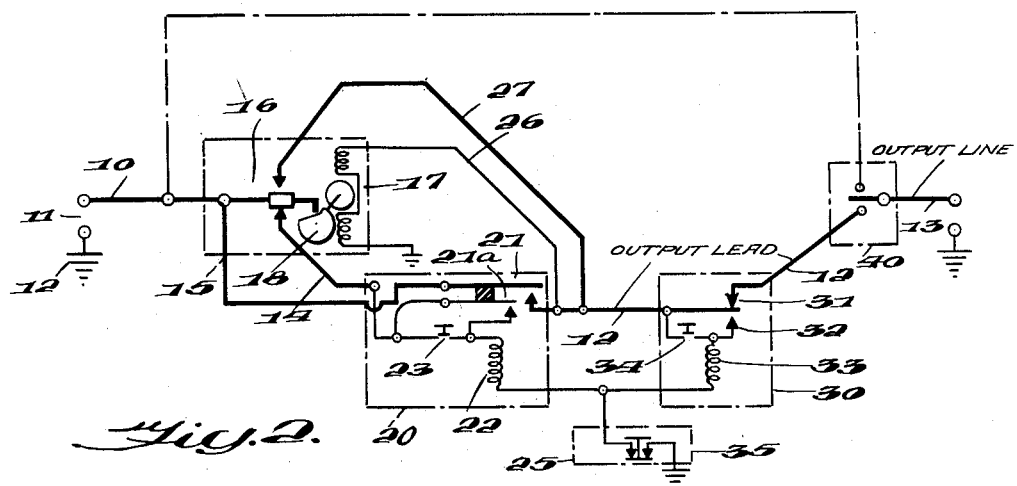
Fig. 1 is a circuit diagram of a preferred embodiment.
Figure 2:
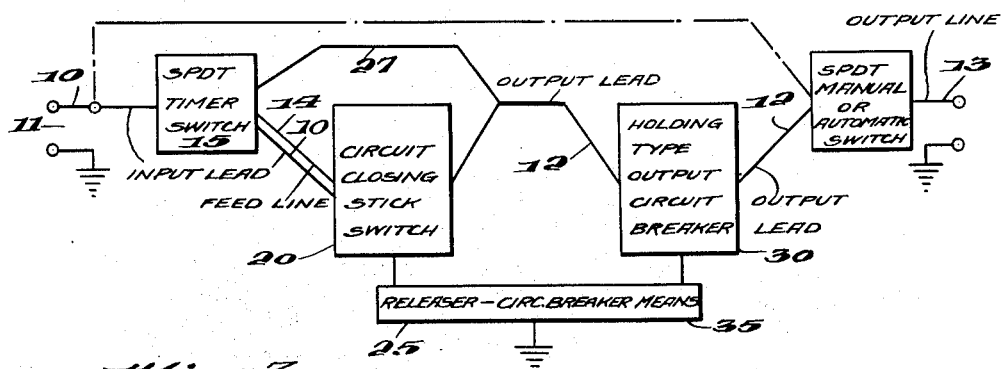
Fig. 2 is a block diagram corresponding thereto.
Figure 3:
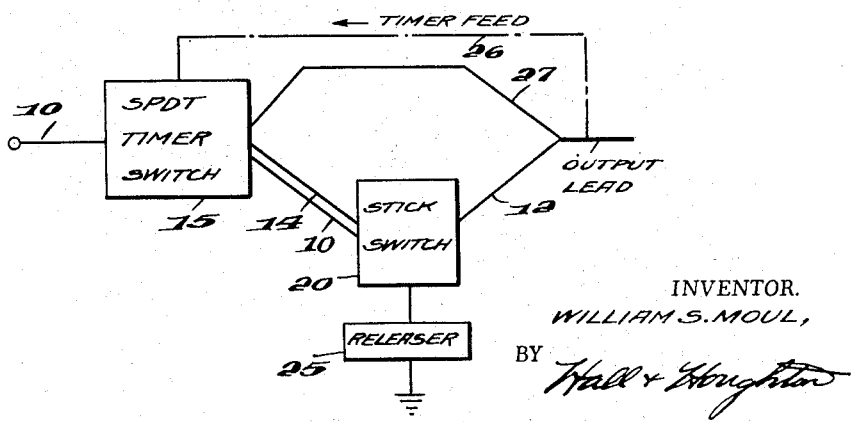
Fig. 3 is a block diagram of a basic sub-combination of the circuit.

In the form shown in Figs. 1–3 the circuit controller comprises an input lead 10 connected to one side of a power source 11, an output lead 12, an output line 13, and a feed line 14. The return side of the power source 11 and other return circuits are represented by ground connections as is conventional, for simplicity. A timer controlled switch 15 is provided for connecting said input lead initially to said feed line 14, and alternatively to said output lead 12. A suitable form of timer controlled switch, as shown in Fig. 1, may comprise a single pole double throw switch 16 having its blade connected to the input lead 10 and its side contacts connected to the feed-line 14 and the output lead 12, respectively. The timer motor 17 in this form of switch is energized from the output lead 12 and may drive a cam 18 which, after a predetermined interval moves the blade 16 into contact with the alternative side contact and thereafter lifts it from the initial contact; subsequently reversing this transferring action.

A circuit closing stick switch 20 is provided for connecting the input line 10 to the output lead 12. In the form shown in Fig. 1, this switch comprises a pair of contacts 21 connecting the input line 10 to the output lead, a second pair of contacts 21a establishing a holding circuit from the feed line 14 through the holding means shown as coil 22, and means for closing the circuit closer 20 comprising the contacts 23 bridging the pair 21a for energizing the holding coil 22 to close the contacts 21, 21a. Means is also provided for releasing the switch 20, herein by de-energizing the coil 22, shown as a releaser in the form of a circuit breaker 25 preferably arranged in the return circuit from coil 22 as shown.

For clarity in Figs. 1 and 3, the lead 26 for energizing the timer from the output lead 12 has been shown separate from the direct connection 27 from switch 16 to output lead 12, but in practice the lead 26 may be omitted, and motor 17 may be connected to lead 27, as a path from output lead 12, as indicated in Fig. 2.

Referring to Figs. 1 and 3, the operation of the basic sub-combination so far described will now be set forth. This operation is initiated by closing of the contactor 23 which closes the circuit closing stick switch 20 and energizes the output

2 lead 12 from the input lead 10. The timer motor 17 now starts its operation. During the initial timing interval thereof, before switch 16 is closed to line 27, opening of the circuit breaker or releaser 25 is effective to deenergize the holding coil 22 and suspend flow of current to the output lead and timer motor. After the initial timing period, when switch 16 has closed to lead 27, the opening of the circuit to the feed line 14 deenergizes holding coil 22 and switch 20 opens without operation of the releaser 25. When this has occurred the timer motor continues to operate for the balance of its timing cycle until the switch 16 again connects to feed line 14, and its operation cannot be suspended by releaser 25.

As is shown in Figs. 1 and 2, the controller preferably comprises, in combination with the basic circuit above described, an output circuit breaker 30 having a pair of contacts 31 connected in the output lead 12. In the preferred form shown in Fig. 1, this circuit breaker is of the single pole double thrown type, with its forward contact 32 connected to energize holding means shown as a coil 33, when the circuit 12 is opened. Means is provided for opening said circuit breaker, shown as comprising the contactor 34 connected from output lead 12 to coil 33. Means is also provided for reclosing this circuit breaker, herein shown as a circuit interruptor 35 connected in the return from coil 33. Preferably, as shown, the returns from the coils 22 and 33 have a common path, and are simultaneously interrupted by the common circuit breaker 25—35.

With this arrangement, as will be apparent from Fig. 1, the circuit breaker 30 cannot be opened until the output lead 12 is energized from the input lead 10. When this energization is by way of feed line 14 (during the initial timing interval above mentioned) closing of contactor or push-button 34 open-circuits the output lead 12 and holds it open, but allows timer 15 to continue its operation. During this interval operation of releaser 25 suspends operation of the timer and also deenergizes output lead 12, but restores the circuit through output circuit breaker 30 ready to supply current to the controlled lead when contactor or push-button 23 is again operated.

After the initial timing interval has passed, closing of contactor or push-button 34 disconnects the load, but without interrupting operation of the timer, and during this period operation of the releaser 25, instead of cutting off supply of power to the load, as during the initial timing interval, reestablishes such supply by releasing the circuit breaker 30.

Means is also provided in the preferred form of Figs. 1 and 2, for supplying current to the load irrespective of the condition and position of the various control instrumentalities heretofore described. To this end the output line 13 is connected to the blade of a single pole double throw switch 40, the side contacts of which are connected respectively to the output side of circuit breaker 30 and the input lead 10.

It will be apparent from the foregoing description that by the arrangements disclosed great flexibility of control, and surprising apparent reversal of the functions of certain parts are achieved. The controller may be arranged for manual or remote control operation and may be provided with pilot lights to indicate its operating condition if desired. It may be employed to control adjacent and remote lighting and other circuits, or for other purposes.

From the foregoing it will be apparent that the illustrative embodiment herein disclosed is illustrative, and not restrictive of the scope of the invention, which is defined in the appended claims.

I claim as my invention:

1. A circuit controller comprising an input lead, an output lead, and a feed line; a timer controlled switch connecting said input lead to said feed line initially, and alternatively directly to said output lead; a stick switch for connecting said input lead to said output lead and having its holding means energized from said feed line, said timer being energized from said output lead.

2. A circuit controller according to claim 1, in which said stick switch is provided with a releaser for deenergizing its holding coil independent of deenergization of said feed line, and in which said timer controlled switch maintains its initial connection for a substantial time interval after initial closing of said stick switch, during which interval operation of said releaser may interrupt operation of said timer and supply of current to said output lead.

3. A circuit controller according to claim 1, in which said timer controlled switch after maintaining the direct connection from said input lead to said output lead for a predetermined time interval breaks the same and restores the feed line connection, thereby terminating the supply of current to said output lead and terminating operation of said timer.

4. A circuit controller according to claim 1 further comprising an output circuit breaker in its output lead, and means energized from said output lead ahead of said circuit breaker operable for opening and holding open said output circuit breaker.

5. A circuit controller according to claim 4 further comprising a releaser for the holding means of said output circuit breaker.

6. A circuit controller according to claim 5 in which said circuit breaker holding means comprises a coil energized from said output lead ahead of said circuit breaker, in which said stick switch holding means comprises a coil energized from said feed line, in which the releaser for said circuit breaker opens the return circuit of its coil, and in which the releaser for said stick switch opens the return circuit of its coil.

7. A circuit controller according to claim 6 in which said return circuits have a common portion, and in which said releasers are embodied in a common circuit breaker in said common portion.

8. A circuit controller according to claim 7 in which said timer controlled switch maintains its initial feed-line energizing connection for a substantial interval after initial closing of said stick switch, during which operation of said common circuit breaker suspends operation of the entire device, and after which operation of said common circuit breaker restores the output lead connection through said output circuit-breaker when the latter has been actuated to break said output circuit.

9. A circuit controller according to claim 1 further comprising an output line, and a single pole double throw switch for connecting said output line either to the output side of said output circuit breaker or to said input lead.

10. A circuit controller comprising an input lead, an output lead, and a feed line; a single pole double throw switch for connecting said input lead to said feed line initially, and alternatively directly to said output lead; a timer motor energized from said output lead and arranged after an interval of operation to place said switch in its direct connecting position, and after a further interval of operation, to return said switch to its initial feed line connecting position; a circuit closer having a pair of contacts connecting said input lead to said output lead, a holding coil energized from said feed line on closing of said circuit closer, means for closing said circuit closer, and means for deenergizing said holding coil.

11. A circuit controller comprising an input lead, an output lead, and a feed line; a single pole double throw switch for connecting said input lead to said feed line initially, and alternatively directly to said output lead; a timer motor energized from said output lead and arranged after an interval of operation to place said switch in its direct connecting position, and after a further interval of operation, to return said switch to its initial feed line connecting position; a circuit closer having a pair of contacts connecting said input lead to said output lead, a holding coil energized from said feed line on closing of said circuit closer, means for closing said circuit closer, and means for deenergizing said holding coil; an output circuit breaker having a pair of contacts connected to said output lead, a holding means energized from said output lead on opening of said circuit breaker, means for opening said circuit breaker, and means for deenergizing said holding means.

12. A circuit controller comprising an input lead, an output lead, an output line and a feed line; a single pole double throw switch for connecting said input lead to said feed line initially, and alternatively directly to said output lead; a timer motor energized from said output lead and arranged after an interval of operation to place said switch in its direct connecting position, and after a further interval of operation, to return said switch to its initial feed line connecting position; a circuit closer having a pair of contacts connecting said input lead to said output lead, a holding coil energized from said feed line on closing of said circuit closer, means for closing said circuit closer, and means for deenergizing said holding coil, an output circuit breaker having a pair of contacts connected in said output lead, a holding means energized from said output lead on opening of said circuit breaker, means for opening said circuit breaker, and means for deenergizing said holding means; said output line having a single pole double throw switch for connecting it to the output side of said output circuit breaker and to said input lead, selectively.

WILLIAM S. MOUL.

No references cited.